United States Patent
Boaz et al.

(10) Patent No.: US 7,329,444 B2
(45) Date of Patent: Feb. 12, 2008

(54) COMPOSITE POLES WITH AN INTEGRAL MANDREL AND METHODS OF MAKING THE SAME

(75) Inventors: Yosef D. Boaz, San Jose, CA (US); Michael Boynoff, Mendocino, CA (US); Paul Cherkas, San Jose, CA (US)

(73) Assignee: Pomm Plastics, Co, San Jose, CA (US)

( * ) Notice: Subject to any disclaimer, the term of this patent is extended or adjusted under 35 U.S.C. 154(b) by 142 days.

(21) Appl. No.: 10/436,359

(22) Filed: May 12, 2003

(65) Prior Publication Data

US 2004/0228995 A1    Nov. 18, 2004

(51) Int. Cl.
*B29D 22/00* (2006.01)
*B29D 23/00* (2006.01)
*B32B 1/08* (2006.01)

(52) U.S. Cl. .......... 428/36.91; 428/36.4; 428/36.5; 156/158; 156/172; 156/187; 156/189; 156/169

(58) Field of Classification Search ........ 156/172, 156/158, 184, 187, 193, 189, 169; 264/560, 264/565, 635; 242/573.8, 575.4; 425/403; 269/48.3; 428/31.91, 36.4, 36.5
See application file for complete search history.

(56) References Cited

U.S. PATENT DOCUMENTS

| | | | | | |
|---|---|---|---|---|---|
| 2,997,529 | A | * | 8/1961 | Fink ................. | 174/138 D |
| 3,929,543 | A | * | 12/1975 | Scott et al. ............. | 156/169 |
| 4,087,502 | A | * | 5/1978 | Hoffmeister ............ | 264/46.4 |
| 4,089,727 | A | | 5/1978 | McClain ................ | 156/350 |
| 4,682,747 | A | | 7/1987 | King, Jr. ............... | 248/68.1 |
| 4,803,819 | A | | 2/1989 | Kelsey ................. | 52/309.1 |
| 5,474,722 | A | * | 12/1995 | Woodhams ............. | 264/45.3 |
| 5,492,579 | A | | 2/1996 | Hosford ................ | 156/64 |
| 5,513,477 | A | | 5/1996 | Farber ................. | 52/726.4 |

* cited by examiner

*Primary Examiner*—Michael Miggins
(74) *Attorney, Agent, or Firm*—Howard Lebowitz

(57) ABSTRACT

The invention is a composite pole with an integral mandrel therein and methods of making the same. A preferred embodiment is a fiberglass reinforced resin composite pole such as a utility pole or a lighting pole. The integral mandrel is preferably an expanded plastic foam such as expanded polystyrene. The integral mandrel is contoured to be in the desired inside configuration of the composite pole and fiber reinforced composite naterial is applied to the mandrel. The pole is used with the mandrel remaining therein, thus strengthening the pole. Passages may be placed into the mandrel for routing conduits and pipes as desired.

28 Claims, 3 Drawing Sheets

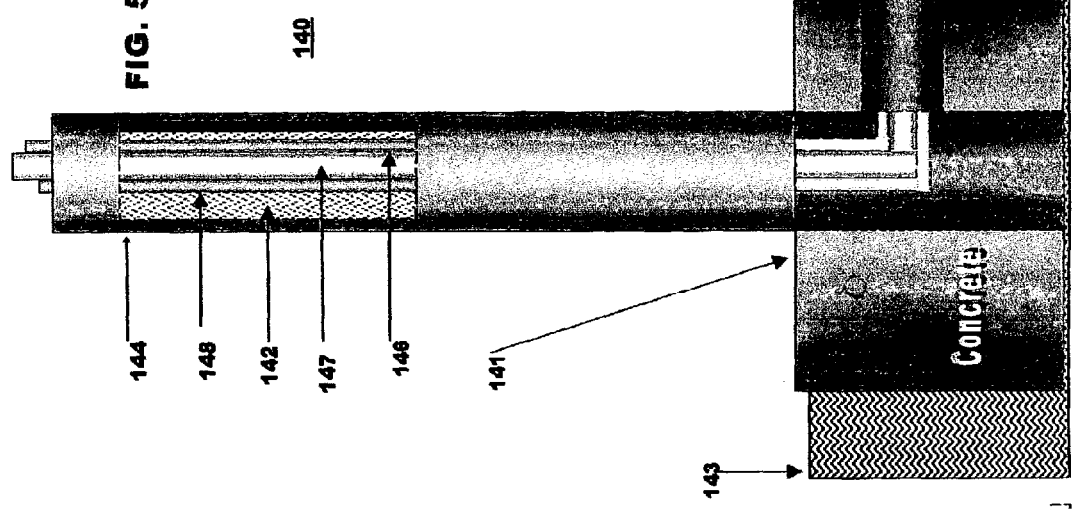
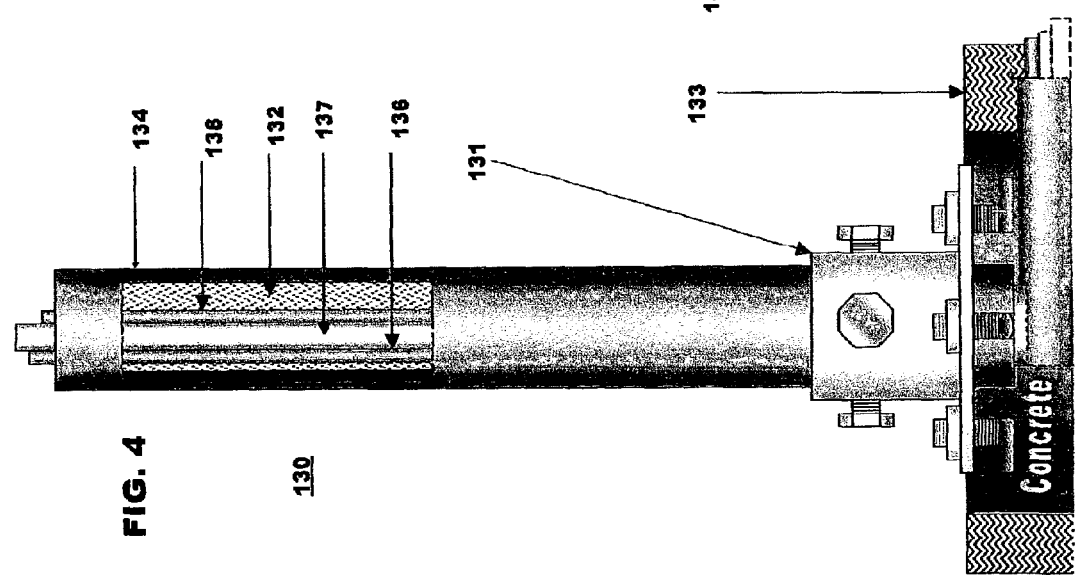

COMPOSITE POLES WITH AN INTEGRAL MANDREL AND METHODS OF MAKING THE SAME

BACKGROUND OF THE INVENTION

1. Field of the Invention

This invention pertains to composite poles, such as utility poles, light poles and antennas having an integral foam core and methods of making and using them.

2. Description of the Prior Art

There is a substantial prior art with respect to composite poles such as utility power transmission poles, light poles, and the like, and methods of making them. Composite poles refers to the fact that the poles are formed from a combination of different materials each of which maintains their identities in the combination to produce a superior result than could be achieved from the individual materials. The composite for making poles is generally fiber-reinforced plastic (FRP), typically fiberglass fibers in a resin matrix, producing what is generally called a fiberglass pole. The reinforcing fibers are not limited to fiberglass, however, and can include the likes of asbestos, jute, sisal, aramid fibers, carbon fibers, and synthetic fibers, though fiberglass has typically been associated with large poles. Resin refers to any polymer that is the matrix for a composite, such as epoxies, polyesters, acrylics and other polymers. The major requirement is that the reinforcing material forms a strong bond to the resin.

The processes for making fiberglass poles involves forming a hollow tube while the resin is in a plastic state and then curing the resin. Curing refers to the process of converting the resin from a plastic state to a hardened state by application of heat, catalyst, ultra-violet light or reactants (curing agents) which convert the resin into a hardened structure, generally three dimensional cross linked structure, which is insoluble and will decompose before it melts.

There are two principal classes of processes known in the prior art for making composite, principally fiberglass poles. These are known as filament winding and pultrusion. A third alternative is a hybrid of filament winding and pultrusion.

Filament winding refers to a process for making an FRP in which a continuous filament or tape is treated with resin and wound onto a mandrel (a metal form whose outer shape is the same size as the desired inner surface of a pole under construction) in a predetermined pattern. The process is performed by drawing the filament from a spool or creel (a creel is a spool and supporting structure) through a bath of resin, then winding it onto the mandrel under controlled tension and in a predetermined pattern. The mandrel may be stationary, in which case the creel structure rotates above the mandrel, or it may be rotated on a lathe about one or more axes. After a sufficient number of layers have been wound the resin is cured and the hardened hollow pole is removed from the mandrel.

U.S. Pat. No. 4,089,727 to Hardy—The McLain, which is hereby incorporated herein in its entirety by reference, disclosed an apparatus and method for preparing a member by wrapping a mandrel with discrete layers of fiber by applying filaments in expanded helices while selectively varying the lead angle of helically disposed fibers along the length of the member. This is accomplished with a unique apparatus that controls the relative axial and rotational movement between a winding head, which dispensed the filament, and the mandrel. This invention is particularly useful in applying filament to a tapered mandrel to make a tapered pole.

Since one of the major problems with composite poles is the cost, it is particularly desirable to minimize the amount of fiberglass component. It is common to make tapered poles with a base having a larger diameter than the tip. When a tapered pole is made by applying windings from base to tip to provide layers of fiber reinforced resin on a tapered mandrel, the resulting pole tends to have a thicker wall at the basis. This is the opposite of what would be desired based on the strength requirement for a pole and results in loss of some of the economies of tapered poles. U.S. Pat. No. 5,492,579 to Hosford, which is hereby incorporated herein in its entirety by reference, disclosed a computer modeled pole in which the layers do not extend the entire length of the pole, thus allowing a pole with longitudinal zones, having thicker walls at the base, thin walls at the tip and intermediate wall thickness between the base and the tip, and approximate minimum weight for a pole of a given strength. Filament winding is a preferred method of making circular cross section poles.

The second class of processes for making composite poles is pultrusion. Pultrusion refers to a continuous process for manufacturing composites with a constant cross-sectional shape. The process consists of pulling a fiber reinforcing material through a resin impregnation bath and into a shaping die where the resin is subsequently cured. The fiber reinforcing Heating to both gel and cure the resin is sometimes accomplished entirely within the die length, which can be on the order of 76 cm (30 inches) long. In other variations of the process, preheating of the resin-wet reinforcement is accomplished by dielectric energy prior to entry into the die, or heating may be continued in an oven after emergence from the die. U.S. Pat. No. 4,803,819, to Kelsey, which is hereby incorporated herein by reference, discloses use of pultrusion to make hollow composite utility poles having diametrical reinforcing struts which add strength to the hollow pole. Pultrusion may pull strands, rovings (a collection of parallel strands which are not twisted together), spun roving (a collection of teisted or braided strands), or mats (randomly oriented chopped filaments or swirled filaments with a binder cut to the contour of a mold). Pultrusion may produce a tube which is unsupported and merely sawed into lengths after hardening. Alternatively the form may be shaped around a mandrel. Pultrusion is a preferred way of making non-circular cross section poles.

Pulwell Industries (Zhongshan Pulwell Composites Co; Ltd) has a variation known as pullwinding which combines the pultrusion and filament winding methods, by pulling a longitudinal composite layer onto a mandrel followed by applying helically wound layers by filament winding. This approach supplies a tube with high crush strength as well as the stiffness of pultruded poles.

It is known in the prior art, that the use of a core material sandwiched between composite layers can reduce the cost and add strength to a laminated structure. In U.S. Pat. No. 4,682,747 to King, an insulted cross arm for supporting wires on a utility pole is disclosed, comprising an outer shell of polyester resin and a inner core of polyurethane foam. Also in U.S. Pat. No. 5,513,477 to Farber discloses a composite, tapered poles made in segments which are assembled to make a hollow, tapered pole when assembled. In one of Farber's preferred embodiments the segments are made of an outer skin and an inner skin of fiber reinforced resin with a foam block "core" bonded between them in the annual space between the outer skin and the inner skin. The word "core" in this context refers to the central layer of a laminate to which the outer layers of the laminate are attached.

While composite poles have many valuable uses, there is a need for improvement in several areas.

There is a need for less expensive composite poles. There is a need for less expensive composite poles by reducing the wall thickness of the poles. There is a need for improved and simplified methods of construction of composite poles.

There is a need for composite poles with greater strength that is not simply accomplished by thicker walls.

Composite poles made by existing processes of filament winding and pultrusion are by their very nature hollow poles (allowing for internal struts as described above in Farber). The original use was as a substitute for wooden utility distribution poles. In this application, the function of the original wooden pole can be mimicked without routing conduit or other vessels through the pole. However, in other applications the interior of the pole is very important. For example, light poles, power poles (e.g. poles for connecting to underground wires), and antennas, all have internal wires which could be provided for in the pole. Also, other mixed use poles could be used to route power lines, data lines, optical lines, and process lines such as lube oil or coolant. There is a need for composite poles having internal provision for routing wires, conduit, process lines and the like.

SUMMARY OF THE INVENTION

One preferred embodiment of the invention is a process for making a composite pole including the steps of shaping an integral mandrel into the form desired for the pole's interior and then applying a plurality of layers of reinforced composite material to the integral mandrel to form a pole including the composite material and the integral mandrel. The reinforced composite material includes a matrix component and a reinforcing component. The matrix components are resinous materials such as epoxies, polyesters, acrylics, phenolics, or urea-formaldehyde resins that cure to form a bond with the reinforcing material. The reinforcing component is a fibrous material such as fiberglass, aramid fibers, carbon fibers, or any of the other fibers that can be used for making fiber-reinforced plastics. In some cases a very desirable pole can be made from a combination of fibers, such as combination of fiberglass and aramid or carbon fibers. In general, the requirement is that the choice of matrix and reinforcing components be such that the matrix forms a strong bond with the reinforcing component.

The integral mandrel is preferably fabricated from an expanded insulating foam, preferably expanded polystyrene foam. Alternative preferred mandrel materials include extruded polystyrene and rigid polyisocyanate. Depending on the type of foam or plastic and the type of composite, the foam or plastic may be coated or otherwise treated to impart protection from the composite while the composite is being applied to the at least one integral mandrel prior to the matrix reaching a cured condition. The integral mandrel is said to be integral because it is not separated from the composite to form a hollow tube as in the prior art poles, but it serves as a mandrel during fabrication and remains an integral part of the finished pole. Since an integral mandrel becomes part of the finished pole, its utility is much greater than merely being a form for the inside surface of the composite as in prior art mandrels. In particular an integral mandrel can advantageously be provided with longitudinal passages or chases through which wires, conduits, or pipes can be conveniently placed while being thermally and electrically isolated by the insulating foam. Expanded foams such as polystyrene can be precisely contoured by hot wire shaping in lengths of up to ten or fifteen feet and diameters up to at least three feet. For longer poles the integral mandrel is made in longitudinal sections shaped to align with each other. The sections are then butted end to end to form the integral mandrel. In most cases, the integral mandrel will have a central passage that can be placed onto a rod to assemble the sections and to hold the integral mandrel while the composite is being applied.

Any of the prior art methods for applying a composite to a mandrel, such as filament winding, pultrusion and pull-winding can be used with an integral mandrel. The conditions for operation must be consistent with the properties of the properties of the integral mandrel material. For example in the case of expanded polystyrene, the maximum use temperature is about 160° F. and the choice of matrix and/or pretreatment of the integral mandrel must be compatible with applying and curing the composite below this temperature. Pretreatment of the integral mandrel can include such steps as applying an external polyethylene envelope, sealing a polystyrene integral mandrel with plastic cement or applying a sealer such as a Portland cement—polymer mixture of the type that is often used to seal polystyrene foam in construction applications. Another optional approach is to use composite layers having different matrix components. For instance applying a first layer which is compatible with and protective of the mandrel and subsequent layers which have other desired properties.

Another aspect of the invention is a composite pole comprising an integral mandrel therein. A preferred embodiment of a composite pole comprises a fiberglass containing composite and a polystyrene integral mandrel having at least one chase through the interior of the integral mandrel. Poles can be any shape commonly used for poles, such as right cylinders of circular or polygonal horizontal cross section, or tapered cylinders.

Another aspect is a method for routing a plurality of components through a pole comprising the steps of fabricating at least one integral mandrel having a passage for each of the plurality of components, applying a plurality of layers of reinforced composite material to the at least one integral mandrel, and routing the plurality of components through the plurality of passages.

The use of an integral mandrel in making a pole simplifies the pole manufacture because it is not necessary to extract the reinforced composite tube from the mandrel. Also, for a given pole strength, less wall thickness is required, and fewer layers of reinforced composite need to be applied.

The integral mandrel strengthens the pole, thus reducing the wall thickness of the composite required to achieve a particular strength.

The integral mandrel can be adapted to provide insulated passages for wires, conduits and process pipes through the pole.

BRIEF DESCRIPTION OF THE DRAWINGS

These and other features, aspects and advantages of the present invention will become better understood with regard to the following description, appended claims and accompanying drawings, where:

FIG. 4 is a vertical cutaway view of a pole in a first configuration where the pole is supported by an above ground collar.

FIG. 5 is a vertical cutaway view of a pole in a second configuration where the pole extends into the ground for support.

DESCRIPTION OF THE PREFERRED EMBODIMENTS

Figure 3:
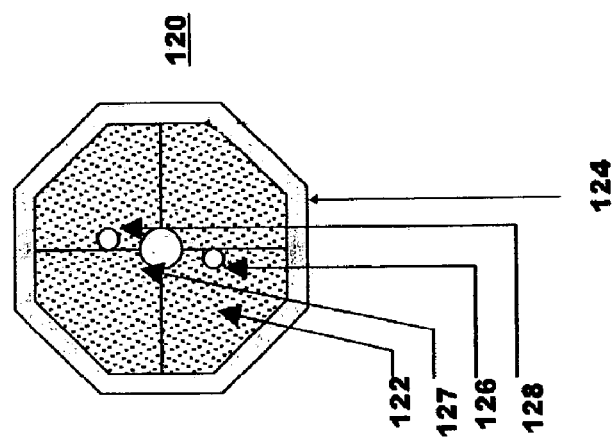
FIG. 3 shows a top view of an octagonal cross section pole.

The invention pertains to improved composite poles and methods for making them. Composite poles are well known in the art and are frequently used to support electrical and/or telephonic distribution wires (distribution poles) and light poles. Composite distribution poles have advantages over wooden poles because they can be much lighter than their wooden counterparts and do not need to be treated with dangerous preservatives. As previously discussed, prior art composite poles have been hollow poles, often formed on a steel mandrel having the desired shape of the interior surface of the hollow pole. The hollow pole is extracted from the mandrel after the composite cures. The instant invention relies on forming the composite around an integral mandrel that will stay with the pole and provide useful benefits not previously known in the prior art.

It should be understood that as applied herein the following terminology will be used as defined below in a manner not inconsistent with the way the terms are used in the art.

A composite material refers to a multiphase material formed from a combination of materials which differ in composition or form, remain bonded together, and retain their identities and properties.

A fiber-reinforced composite (FRC) refers to a composite structural material containing high-strength fibrous material embedded in a resinous matrix which when the resin cures develop mechanical properties greatly superior than the base resin. In the current context the fiber is often fiberglass, hence the incorrect usage that FRC refers too fiberglass reinforced composite.

A resin refers to any polymer that is used as a matrix in composites to contain the reinforcement material.

Curing refers to the change in the properties of a plastic or resin by chemical reaction, for example by condensation, polymerization, or addition. Curing may occur in the presence of elevated temperature, pressure, or catalysts.

Curing agents refers to substances or mixtures of substances added to a polymer composition to promote or control the curing reaction. An agent which does not enter into the reaction is known as a catalytic hardener or catalyst. A reactive curing agent or hardener is generally used in much greater amounts than a catalyst, and actually enters into the reaction. Cross-linking agents are distinguished from catalysts because they react with molecules and are coupled directly into the cured system as a structural member of the polymer.

Fiber refers to a single homogeneous strand of material having a length of at least 5 mm, which can be spun into a yarn or roving, or made into a fabric.

Filament refers to a long continuous fiber used in making a FRC pole.

A mat is a fibrous material for reinforced plastic consisting of randomly oriented chopped filaments or swirled filaments with a binder cut to the contour of a mold. Mats are available in blankets of various widths, lengths and weights.

A strand is a bundle of filaments in a single compact unit without a twist.

A roving is a number of strands collected into a parallel bundle.

A spool is a cylindrical piece about which a filament is wound.

A creel is a spool and its supporting structure on which continuous strands or rovings of reinforcing material are wound.

A mandrel is a form around which pultruded or filament wound poles are shaped.

An integral mandrel is a form around which a composite pole is shaped and which remains an integral part of the finished pole.

Tape refers to a unidirectional fiber or filament impregnated with resin.

The filament winding process is one of the principal processes for making a composite pole. It refers to an automated process in which continuous filament (or tape) is treated with resin and wound on a mandrel in a helical pattern. Reinforcements commonly used are single strands or rovings of glass, asbestos, carbon, aramid, jute, sisal, cotton and synthetic fibers, while the resins include epoxies, polyesters, acrylics, phenolics, urea-formaldehydes and others. To be effective, the reinforcing material must form a strong adhesive bond with the resin. The process is performed by drawing the reinforcement from a spool or creel through a bath of resin, then winding it on the mandrel under controlled tension and in a predetermined pattern. The mandrel may be stationary, in which event the creel structure rotates above the mandrel, or it may be rotated on a lathe about one or more axes. By varying the relative amounts of resin and reinforcement, and the pattern of winding, the strength of filament wound structures may be controlled to resist stresses in specific directions. After sufficient layers have been wound, the structure is cured. Filament winding is discussed in U.S. Pat. Nos. 4,089,727 and 5,492,579.

Pultrusion is a second principal process for making composite poles. It refers to a continuous process for manufacturing composites with a constant cross-sectional shape. The process consists of pulling a fiber reinforcing material through a resin impregnation bath and into a shaping die where the resin is subsequently cured. In most cases, the composite is gelled and cured by heating within the die, which can be on the order of 76 cm (30 inches) long. In other variations of the process, curing continues beyond the die while the pole is formed around a mandrel. The pultrusion process yields continuous lengths of material with high unidirectional strengths. Pultrusion is discussed in U.S. Pat. No. 4,803,819.

Pullwinding is a hybrid of pultrusion and filament winding processes. In pullwinding filaments are pulled onto mandrel while other filaments are wound onto the mandrel in a helical pattern. This combination produces a pole with high strength both axially and radially.

One aspect of the invention is a process for making a composite pole comprising shaping an integral mandrel to a desired internal configuration and then applying layers of composite material to the integral mandrel.

The process can be advantageously applied to producing so-called fiberglass poles, though it is not limited to fiberglass and may be applied to other fibers such as but not limited to aramid or carbon fibers. A preferred material for an integral mandrel is an expanded insulating foam, more preferably expanded polystyrene foam. Alternative mandrel materials comprise extruded polystyrene and rigid polyisocyanate. Expanded polystyrene can be precisely contoured using hot wire shaping, technology which is in wide use today and is well known to those skilled in the art. Pieces can be readily handled in the range of diameters up to about three feet and lengths up to about 10 to 15 feet. Longer poles can be made by using an integral mandrel in separate longitudinal sections of 10 to 15 feet butted together.

An integral mandrel is shaped on its outer surface to conform to the shape desired for the composite portion of the pole that will be formed around it. The integral mandrel is also, preferably, shaped on the interior to provide longitudinal passages. In most applications, the integral mandrel has at least one longitudinal passage in the center that will be used to hold it on a rod when the composite is applied.

Other longitudinal passages are formed into integral mandrel to conform to the use intended for the pole. Insulating foam has many desirable properties as a material for an integral mandrel, such as thermal and electrical insulating properties. Polystyrene foams are also available with high antistatic properties such as expanded polystyrene made from DYLITE™ MX44-SF antistatic expandable polystyrene (ARCO Chemical). Antistatic foam would be advantageously applied to routing DC power lines through a pole between a wind turbine and an inverter to prevent line losses.

Expanded polystyrene is also available in forms that provide magnetic shielding. This form of integral mandrel would be desirable for isolating data transmission lines.

The insulating and isolating properties of a foam integral mandrel allow mixed use poles having a plurality of passages filled with various conduits routing electrical wires, signal lines, fiber optic lines, and process flows such as grease, oil, or coolant. The many applications and uses will be apparent to those skilled in the art.

The presence of an integral mandrel in the finished pole also provides additional strength compared to a conventional hollow pole, therefore the requisite thickness of the composite, i.e. the number of layers of reinforced composite put on the mandrel, is reduced due to the presence of the integral mandrel in the pole. This effect is illustrated in Example 1, with respect to the increase in moment of inertia of a hollow pole and a pole with an integral mandrel. It important to note that the maximum improvement in moment of inertia is achieved with poles made according to the instant invention, because the moments of the components (the hollow tube and the integral mandrel) are additive. Moments of bodies are additive only when they are bound together so that they react as a single unit.

Layers of composite material are applied to the integral mandrel by the same types of processes that are used for forming conventional hollow poles on conventional mandrels. One preferred method is filament winding where filaments treated with resin are wound about the mandrel as filaments, strands, rovings, or tapes to form layers. Many ways of winding are possible within the scope of the invention, preferred methods and patterns include those described in U.S. Pat. Nos. 4,089,727 and 5,492,579, where the latter applies particularly to tapered poles.

It is important to note that the choice of composite materials and operating conditions particularly for curing the resin must be compatible with the properties of the integral mandrel. For a polystyrene foam integral mandrel the mandrel should not be heated above about 140 to 160° C., also polystyrene will dissolve in many organic solvents. The temperature limitation favors epoxy resins and urea formaldehyde resins that cure at low temperature. Curing agents and catalysts are preferred to heat for curing the resinous matrix.

A preferred option is to treat the formed foam prior to applying the composite. Preferred treatments include applying a film coating, such as a polyethylene coating prior to applying the composite. Another treatment is to apply a protective coating such as are commonly used to protect polystyrene foam in construction applications, such as a polymer—Portland cement mixture. Another alternative is to dip the foam mandrel in plastic cement.

The conduits and pipes may be inserted in the longitudinal passages either before or after application of the composite. They are preferably inserted prior to application of the composite.

Pultrusion can also be used to apply the composite to the integral mandrel. In this case filaments, strands, or rovings impregnated with resin are pulled axially on to the integral mandrel with or without a forming die. Pultrusion can also be used by pulling a mat onto the mandrel. The same considerations apply here as with filament winding with respect to operating conditions and materials. In this application of pultrusion, it is preferred not to cure the resinous matrix by heating the extrusion die, but rather to cure on the mandrel due to chemical and/or catalytic reaction.

Pullwinding can be applied to an integral mandrel by pulling axial layers and winding helical layers.

The process can be applied well to tapered poles, right cylindrical poles, poles with circular or elliptical, or polygonal horizontal cross section. A long pole is made by using a mandrel having a plurality of sections. The passages are aligned from section to section. The sections are threaded onto a rod through a central longitudinal passage and held together at the ends so that the sections butt end to end.

EXAMPLE 1

This example shows how the strength of a pole with an integral mandrel is stronger than a hollow pole for a given wall thickness, or in the alternative a pole need have less wall thickness for a given strength.

The moment of inertia is a term used to describe the ability of a cross section to resist bending.

For a hollow cylinder the moment of inertia, I, is given by equation (1).

$$I=(\tfrac{1}{2})(M)(b^2+a^2) \tag{1}$$

Where: I is the moment of inertia, M is the mass of the hollow cylinder, b is the outside radius of the cylinder, and a is the inside radius of the cylinder.

The moment of inertia of a solid cylinder is given by equation (2).

$$I=(\tfrac{1}{2})(M)(a)^2 \tag{2}$$

Were a is the radius of the cylinder.

For a hollow pole with an integral mandrel the overall moment is the sum of the two parts.

The density of the fiberglass composite is 120 pounds per cubic foot, and the density of the expanded fiberglass foam is 3 pounds per cubic foot. The comparison below shows the moment of inertia for a hollow pole and for a pole with integral mandrel for a 40-foot high pole with 36-inch diameter, and 0.3-inch wall thickness.

I (hollow pole)=2482 pound–foot squared

I (pole and integral mandrel)=3373 pound–foot squared

Put another way, a wall thickness for the tube and mandrel of only 0.19 inches has a moment equal to the 0.30-inch hollow pole.

Another preferred embodiment is a composite pole having an integral mandrel therein. The composite pole comprises an outer composite portion made up of a resinous matrix and reinforcing fibers. Preferred matrix materials include epoxies, polyesters, acrylics, phenolics, and urea-formaldehydes. Preferred reinforcing fibers include fiberglass, aramid fibers and carbon fibers. The integral mandrel is preferably an expanded insulating foam, more preferably expanded polystyrene foam. The integral mandrel preferably contains longitudinal passages, which may be filled with various wires, conduits, and pipes. The pipe cross section can be circular, elliptical, or polygonal. The pole may be either tapered or right cylindrical.

Figure 1:
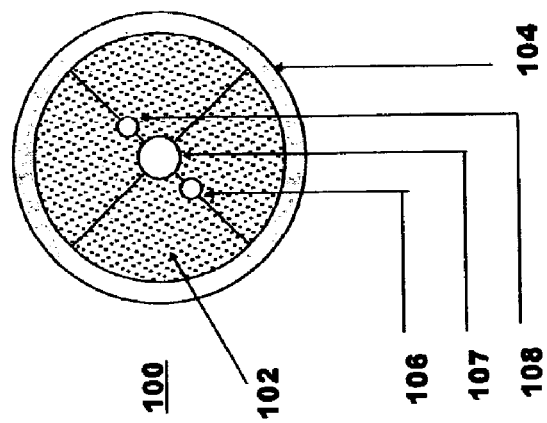
FIG. 1 shows a top view of a circular cylindrical pole.

Turning to the figures, FIG. 1 shows a circular cross section pole 100 with an integral mandrel 102, a composite outer wall 104, and longitudinal passages (chases) 106, 107, and 108 which may carry fluids, electrical wires, optical fiber lines, radio signal carriers, and the like.

Figure 2:
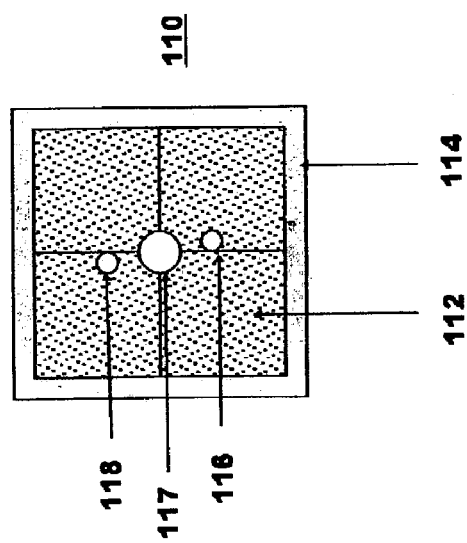
FIG. 2 shows a top view of a square cross section pole.

FIG. 2 shows similarly a square cross section pole 110, with an integral mandrel 112, a composite outer wall 114, and longitudinal passages (chases) 116, 117, and 118 which may carry fluids, electrical wires, optical fiber lines, radio signal carriers, and the like.

FIG. 3 shows an octagonal cross section pole 120, with an integral mandrel 122, a composite outer wall 124, and longitudinal passages (chases) 126, 127, and 128 which may carry fluids, electrical wires, optical fiber lines, radio signal carriers, and the like.

FIG. 4 is a vertical cutaway, of a pole 130 supported by an above ground collar 131. The cutaway view shows the outer composite wall 134, and three conduits 136, 137, and 138 filling vertical passages in the integral mandrel 132. The conduits exit at the bottom of the pole below ground level 133.

FIG. 5 shows a similar pole 140 supported by a portion of the pole concreted below ground level 143 from the concreted section 141. The cutaway view shows the outer composite wall 144, and three conduits 146, 147, and 148 filling vertical passages in the integral mandrel 142

Figure 6:
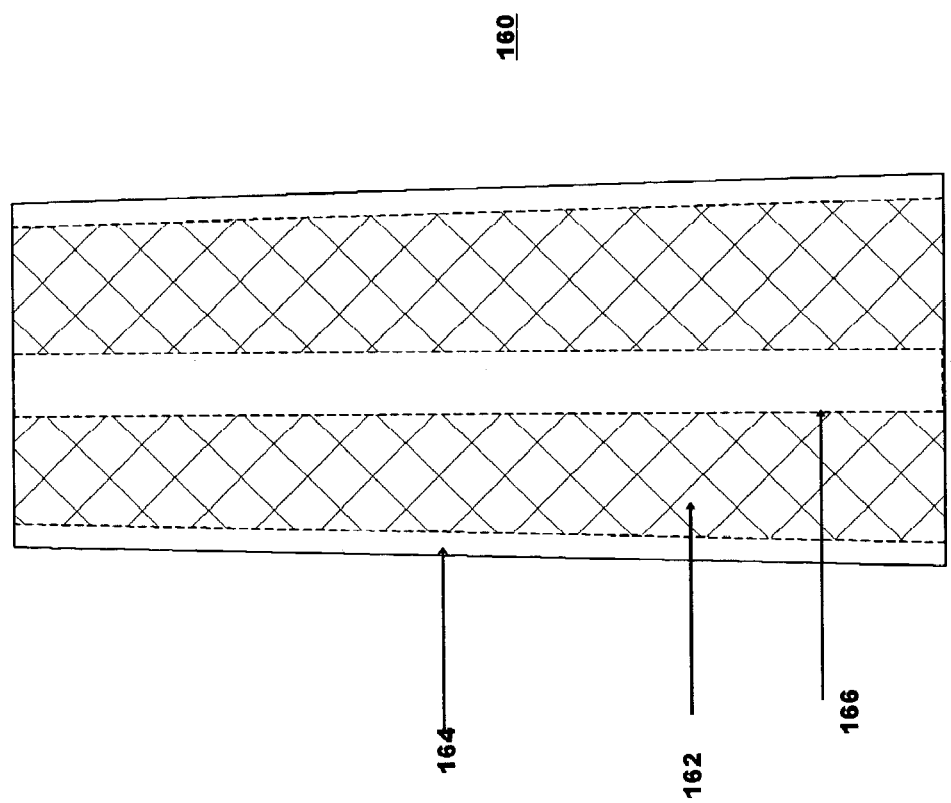
FIG. 6 is a front view of a tapered pole.

FIG. 6 shows a tapered pole 160, with a composite wall 164, an integral mandrel consisting of two parts 162, and 163 and a single conduit 166.

Although the present invention has been described in considerable detail with reference to certain preferred versions thereof, other versions are possible. Therefore the spirit and scope of the appended claims should not be limited to the preferred versions herein.

What is claimed is:

1. A method of making a composite pole with an integral mandrel therein, comprising the steps of:
   a) shaping at least one integral mandrel to a desired internal configuration of the composite pole, wherein the at least one integral mandrel comprises expanded insulating foam, and wherein said shaping comprises shaping the outer contour of the at least one integral mandrel and cutting at least one longitudinal passage through the at least one integral mandrel;
   b) applying a plurality of layers of composite material to said at least one integral mandrel, wherein said composite material comprises a reinforcing material and a matrix, wherein the composite pole formed from said composite material is integrally bound to said at least one integral mandrel;
   c) allowing said at least one integral mandrel to remain within said pole to form a finished pole, such that the finished pole contains the at least one longitudinal passage passing through the pole;
   d) after the finished pole is formed, inserting at least one object through the entire length of the finished pole through the at least one longitudinal passage; and
   e) wherein said at least one integral mandrel comprises a plurality of integral mandrels butted together end to end, such that the at least one longitudinal passage is in alignment relationship among the plurality of integral mandrels.

2. The method of claim 1 wherein the insulating foam comprises expanded polystyrene.

3. The method of claim 1 wherein the at least one integral mandrel comprises a material chosen from the group consisting of expanded polystyrene, extruded polystyrene, and rigid polyisocyanate.

4. The method of claim 1 wherein the object is chosen from the group consisting of pipes and conduits.

5. The method of claim 1 wherein the at least one integral mandrel comprises a plurality of longitudinal passages.

6. A composite pole made according to the method of claim 5.

7. The method of claim 1 wherein the horizontal cross section of the at least one integral mandrel is chosen from the group consistings of circles, ellipses, and polygons.

8. The method of claim 7 wherein the at least one integral mandrel is a right cylinder.

9. The method of claim 8 wherein the moment of inertia of the composite pole is greater than the moment of inertia of a hollow pole consisting of said composite material having said internal configuration.

10. The method of claim 8 wherein the moment of inertia of the composite pole is greater than the moment of inertia of a hollow pole consisting of said composite material having said internal configuration.

11. The method of claim 7 wherein the reinforcing material comprises a material chosen from the group consisting of fiberglass, aramid fibers, carbon fibers.

12. The method of claim 11 wherein the matrix material comprises a material chosen from the group consisting of epoxies, polyesters, acrylics, phenolic resins, and urea-formaldehyde resins.

13. The method of claim 12 further comprising the act of applying a protective coating to the at least one integral mandrel, whereby the at least one mandrel is protected from attack by the matrix material.

14. A composite pole made according to the method of claim 13.

15. The method of claim 12 wherein the step of applying a plurality of layers of composite material comprises wrapping the at least one integral mandrel with fiber treated with the matrix material using a filament-winding process.

16. A composite pole made according to the method of claim 15.

17. The method of claim 12 wherein the step of applying a plurality of layers of composite material is accomplished by a pultrusion process.

18. A composite pole made according to the method of claim 17.

19. The method of claim 12 wherein the step of applying a plurality of layers of composite material is accomplished by a pullwinding process.

20. A composite pole made according to the method of claim 19.

21. A composite pole made according to the method of claim 19.

22. The composite pole of claim 21 wherein the reinforcing material comprises material chosen from the group consisting of fiberglass, aramid fibers, and carbon fibers.

23. The composite pole of claim 22 wherein the matrix comprises a resinous material chosen from the group consisting of epoxies, polyesters, acrylics, phenolic resins, and urea-formaldehyde resins.

24. The composite pole of claim 21 wherein the expanded insulating foam comprises expanded polystyrene foam.

25. The composite pole of claim 21 wherein the vertical cross-section is tapered.

26. The composite pole of claim 21 comprising an antenna wire routed through the at least one longitudinal passage.

27. The composite pole of claim 21 comprising a power wire routed through the at least one longitudinal passage.

28. The composite pole of claim 21 wherein the at least one longitudinal passage comprises a plurality of longitudinal passages and wherein the plurality of longitudinal passages contain a plurality of objects, one object to a passage where the plurality of objects are chosen from the group consisting of electrical wires, communication wires, and fluid flows.

* * * * *